United States Patent (10) Patent No.: US 7,957,315 B2
Duffield et al. (45) Date of Patent: Jun. 7, 2011

(54) SYSTEM AND METHOD FOR SAMPLING NETWORK TRAFFIC

(75) Inventors: Nicholas Duffield, Summit, NJ (US); Lee M. Breslau, Basking Ridge, NJ (US); Cheng Ee, Rockaway, NJ (US); Alexandre Gerber, Madison, NJ (US); Carsten Lund, Berkeley Heights, NJ (US); Subhabrata Sen, New Providence, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 189 days.

(21) Appl. No.: 12/342,957

(22) Filed: Dec. 23, 2008

(65) Prior Publication Data

US 2010/0161791 A1 Jun. 24, 2010

(51) Int. Cl.
H04L 12/26 (2006.01)
(52) U.S. Cl. ........................ 370/252; 709/224
(58) Field of Classification Search .................. 370/216, 370/221, 222, 223, 224, 241, 250, 251, 252, 370/253, 229, 230, 231, 232, 233, 234, 351, 370/389, 392; 709/223, 224
See application file for complete search history.

(56) References Cited

U.S. PATENT DOCUMENTS

| | | | | |
|---|---|---|---|---|
| 6,873,600 | B1 * | 3/2005 | Duffield et al. | 370/252 |
| 7,080,136 | B2 | 7/2006 | Duffield et al. | |
| 7,299,283 | B1 | 11/2007 | Duffield et al. | |
| 7,353,388 | B1 * | 4/2008 | Gilman et al. | 713/168 |
| 7,536,455 | B2 * | 5/2009 | Duffield et al. | 709/223 |
| 2003/0007637 | A1 * | 1/2003 | Banks | 380/51 |
| 2005/0213504 | A1 * | 9/2005 | Enomoto et al. | 370/235 |
| 2006/0242694 | A1 * | 10/2006 | Gold et al. | 726/13 |

* cited by examiner

Primary Examiner — Chi H Pham
Assistant Examiner — Weibin Huang

(57) ABSTRACT

Disclosed herein are systems, computer-implemented methods, and computer-readable media for sampling network traffic. The method includes receiving a plurality of flow records, calculating a hash for each flow record based on one or more invariant part of a respective flow, generating a quasi-random number from the calculated hash for each respective flow record, and sampling flow records having a quasi-random number below a probability P. Invariant parts of flow records include destination IP address, source IP address, TCP/UDP port numbers, TCP flags, and network protocol. A plurality of routers can uniformly calculate hashes for flow records. Each router in a plurality of routers can generate a same quasi-random number for each respective flow record and uses different values for probability P. The probability P can depend on a flow size. The method can divide the quasi-random number by a maximum possible hash value.

20 Claims, 5 Drawing Sheets

SYSTEM AND METHOD FOR SAMPLING NETWORK TRAFFIC

BACKGROUND OF THE INVENTION

1. Field of the Invention

The present invention relates to network traffic sampling and more specifically to trajectory-based and threshold-based network traffic sampling.

2. Introduction

Routers summarize traffic flows in flow records which are exported to collectors, possibly through a mediation device. The mediation device has the ability to sample or otherwise select subsets of flow records in order to achieve different traffic analysis goals. Some current approaches to network traffic sampling include trajectory based (or hash based) sampling and threshold based sampling. Trajectory based sampling observes trajectories at each router of a subset of all packets traversing the network. Threshold sampling observes a subset of flow records based on a threshold, such as flow size. None of these methods can consistently select subsets of flow records generated by different routers that a flow traverses with a selection probability that depends on the fields of the flow record. A given flow record can not be selected either at routers it traverses with a specified selection probability. Accordingly, what is needed in the art is an improved way to sample network traffic that blends characteristics of trajectory based sampling and threshold based sampling.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for sampling network traffic. The method includes receiving a plurality of flow records, calculating a hash for each flow record based on one or more invariant part of a respective flow records, generating a quasi-random number from the calculated hash for each respective flow record, and sampling flow records having a quasi-random number below a probability P. Invariant parts of flow records include destination IP address, source IP address, TCP/UDP port numbers, TCP flags, and network protocol. A plurality of routers can uniformly calculate hashes for flow records. Each router in a plurality of routers can generate a same quasi-random number for each respective flow record and uses different values for probability P. The probability P can depend on a flow size. The method can divide the quasi-random number by a maximum possible hash value.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
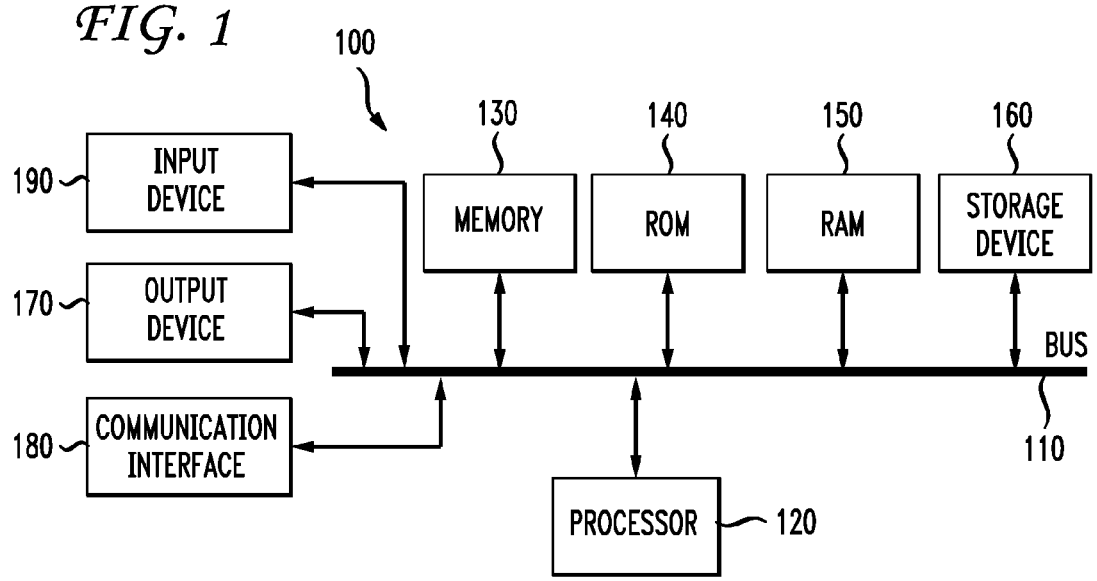
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. Particular functionality may also be built into the design of a separate computer chip. A processing unit includes any general purpose CPU and a module configured to control the CPU as well as a special-purpose processor where software instructions are incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
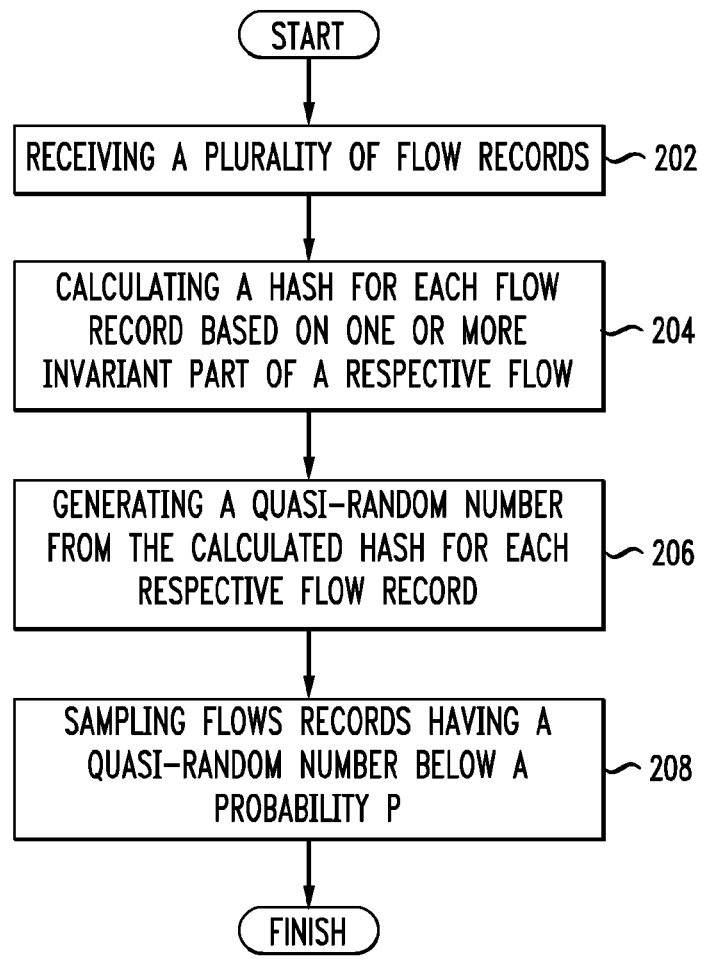
FIG. 2 illustrates an example method embodiment.

Having disclosed some fundamental system components, the disclosure turns to the example method embodiment as shown in FIG. 2. For the sake of simplicity, the example method embodiment is discussed in terms of a system configured to practice the method. Flow records are summaries of traffic flowing through a network node, typically a network router. Netflow by Cisco Systems is one example of a protocol designed to gather network flow records. The system can be one router in a data network having multiple routers. In one embodiment, a data network contains multiple routers configured to sample data flows uniformly in order to gather information in a consistent, meaningful way. The system first receives a plurality of network flows (202). The system calculates a hash for each flow based on one or more invariant part of a respective flow (204). When a flow traverses the network, each traversed router produces a flow record for that flow. Each flow record is the same in the sense that the flow record from each router reports the same set and number of packets. Each flow has a uniform source and destination IP addresses, TCP/UDP port numbers, TCP flags, network protocol, number of bytes, and number of packets. Trajectory sampling of network traffic is based on this principle. The system can calculate the hash based on these invariant parts of the flow record. These parts are invariant because they are the same as each router. In fact, a plurality of routers in a data network can uniformly calculate hashes for flows for consistent network-wide flow sampling.

The system generates a quasi-random number from the calculated hash for each respective flow (206). The number is quasi-random because the distribution of numbers should be uniformly distributed over the interval of possible values given a good hash function and a reasonable distribution of flow records. In an ideal situation, each flow record has a different quasi-random number, but with millions of flows of packets between different source and destination IP addresses, that is usually not feasible. In one example, the system generates a number between 0 and 1 by generating a random number between 0 and 256 and dividing it by 256. In this way, the system effectively sets the probability to 1 or more if the size of the flow exceeds that threshold. Because the quasi-random number is evenly distributed, the actual probability that the flow is selected is the probability P. In this way, the system achieves size-dependent sampling and trajectory sampling and the system operates on flow records within a data network.

The system samples flow records having a quasi-random number below a probability P (208). In one aspect, each router in a plurality of routers generates a same quasi-random number for each respective flow record and uses different values for probability P. In another aspect, each router uses the same value for probability P. For example, routers can use the same probability P when the routers happen to sample all the same packets, or when routers sample all packets. One example of this is when the packet sampling rate is set to 1 in some part of the network. The system can set the sampling rate to 1 when the routers can accommodate the traffic load without required sampling. Probability P can be either constant or variable by design or by circumstance in the system. Whether probability P is the same or different does not frustrate the purpose or principle of operation. One possible value for P is 1, although P can depend on any field in the flow records, including invariant fields, such as size of the flow or number of packets in the flow. The system can divide the quasi-random number by a maximum possible hash value to obtain a number between 0 and 1 inclusive. For instance, if the quasi-random number for a particular flow is 181 and the maximum possible hash value is 512, 181/512=0.353515625. If the probability P is 0.4, the system samples the particular flow because 0.353515625 is less than 0.4. After the system samples the selected flow records, the system can export sampled flow records to a central collector. The central collector can be a designated router or it can be a non-router computing or storage device.

The described system provides a way to sample flows incorporating principles of both trajectory sampling and threshold sampling. This approach can be advantageous in applications in the network where it is desirable to understand how a given flow traversed the network, which routers a given flow passed through, the timing, the times at which it hit given routers, and other network traffic characteristics. This approach combines the benefits of trajectory sampling with smart sampling to ensure that the system samples large network flows. In this approach, the system must first decide the probability that it will sample a given flow and make sampling consistent across each router that the flow encounters. While this disclosure incorporates some attributes and benefits of threshold sampling and packet-level trajectory sampling (described in U.S. Pat. Nos. 7,299,283, 7,080,136, and 6,873,600), this disclosure is distinct in that it blends the two approaches.

In some cases, a network drops packets in a data flow, so the flow is not exactly the same at each router in a network. The number of packets and bytes reported in flow records generated but different routers can vary. In these cases, even though the hash value is the same, the target probability can be different because the probability P can be a function of the number of packets in the flow. If routers independently sample packets, different routers will see different packets. Also packets can be lost in transit between different routers. Thus, the probability P can be different between different routers for the same flow. This can pose a problem because routers can make different sampling selection decisions if the decision is close to the threshold. If the hash value is very different from this probability P calculated by the routers, then a small change in the probability due to sampling different sets of packets or sampling a set of packets with missing packets can change the probability. If the hash value is well away from the probability, then the changed probability will not impact the system's decision. It will only impact the system's decision when the two are very close. The system can flag network flows where the two are very close and sample them regardless. The system can determine if the hash value and probability are close based on some baseline figure, such as an average rate of packet loss in the network as a whole, at a particular router, in a particular segment, and/or at a particular time. When the hash value is well away from the probability, the system can attach a high confidence score to gathered data, indicating that the observed network flow was not near the threshold. When gathered data is near the threshold, the system can attach a low confidence score. Then a user can determine whether or not to discard the gathered data with a low confidence score.

In order to optimize bandwidth for collection of flow records, routers can perform anti-consistent sampling, where the system samples each flow record generated by a particular packet set as the set traverses the network. The routers maintain a private subrange of the hash range, the subranges being disjoint across routers. The flow record selection process is similar to that described above. Suppose, for example, there are m routers and set boundaries $0=b(0)<b(1)< \ldots <b(m)=n-1$ in the hash range. Router i selects a flow record with target probability p provided its hash $h(w)$ lies in the interval $[b(i-1), p*b(i)+(1-p)*b(i-1)]$. In general $p=p(x)$ can depend on the packet content. Specifically, when x is the flow bytes, this approach yields a size dependent sampling.

Figure 3:
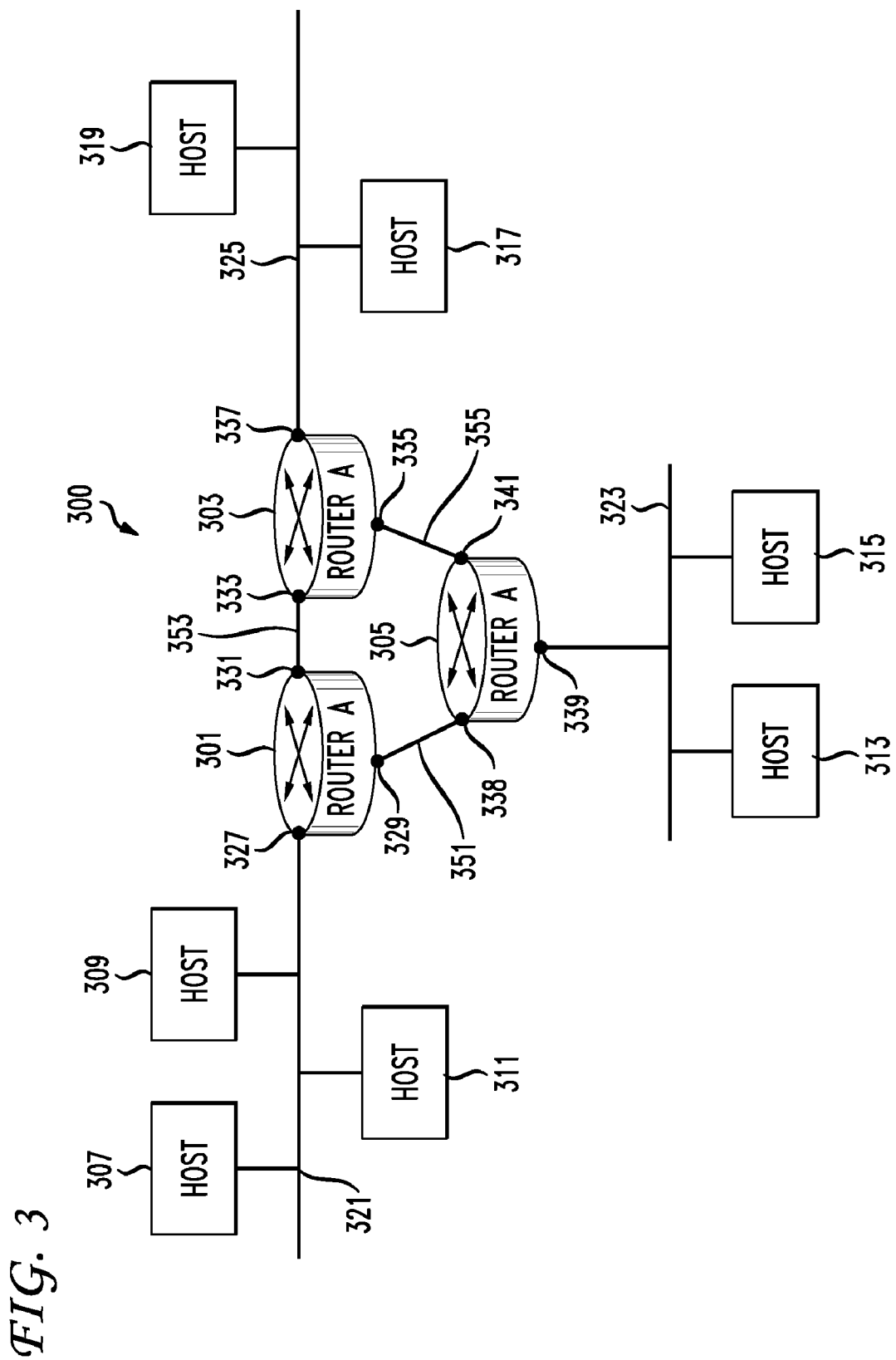
FIG. 3 illustrates an exemplary data network that utilizes spatially consistent sampling of flow records with a content dependent sampling rate.

FIG. 3 illustrates an exemplary data network 300 that utilizes spatially consistent sampling of flow records with a content dependent sampling rate. In the exemplary embodiment of the invention, data network 300 supports Internet Protocol (IP) messaging for the users (customers) of host 307, 309, 311, 313, 315, 317, and 319. The data network 300 can also support other data/network protocols. A host can be a personal computer, workstations, mainframes, file servers, thin client, PDA, smart phone, or other computing device. Hosts 307, 309, and 311 are configured on data link 321; hosts 313 and 315 are on data link 323; and hosts 317 and 319 are configured on data link 325. In order for a host, such as host 311, to communicate to another host, such as host 319, on a different data link, the data network 300 routes IP messages through routers 301, 303, and 305 and data links 351, 353, and 355. A router forwards packets between hosts and other routers in order to enable hosts not directly connected to the same link to communicate. Each router has at least one port (e.g. 327, 329, and 331 for router 301) that connects to a data link. Similarly, ports 333, 335, and 337 correspond to router 303, and ports 338, 339, and 341 correspond to router 305. A typical data network transports many flows. Hosts can provide various services and information to one another and request services or information from one another. One host can serve as a central collector for sampling information. Each router can include a local collector for storing a limited amount of sampling information. When a router's local collector is full, at some other interval, or on request, the central collector receives sampling information from various routers in the data network 100.

Figure 4:
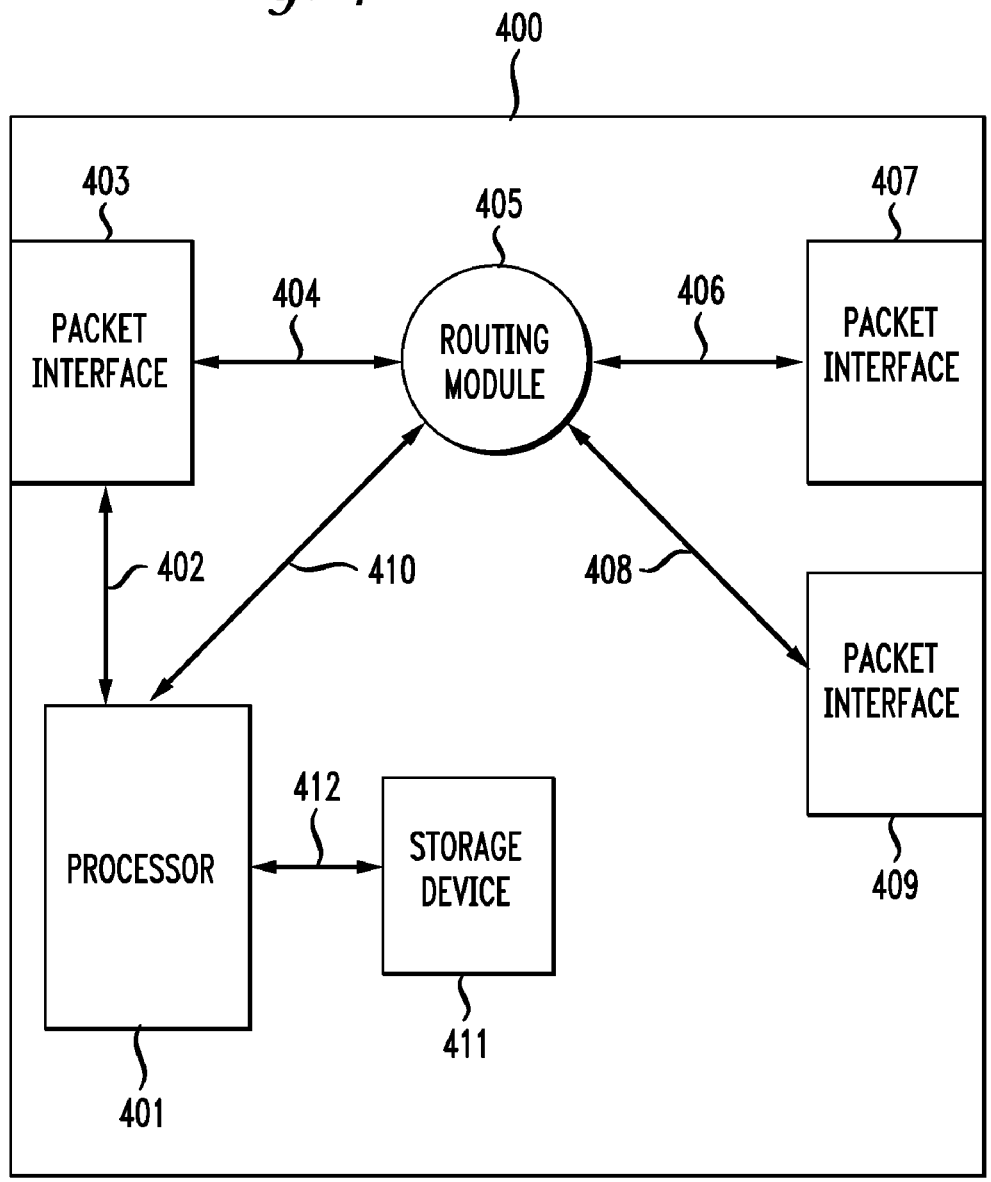
FIG. 4 illustrates a router for sampling network flows in a data network.

FIG. 4 illustrates a router 400 for sampling network flows in a data network. While a router is shown, a generic, non-routing network monitoring appliance or equivalent can replace the router. The router 400 receives and sends packets that are transported by a data network through packet interface 403. The processor 401 receives packets containing traffic information through the link 402 from the packet interface 403. The router 400 provides router functionality with routing module 405. The routing module 405 directs packets between packet interfaces 403, 407, 409 through links 404, 406, 408. The processor 401 configures the routing module 405 through the link 410 in accordance with traffic information received through the link 402. The processor 401 executes computer instructions corresponding to the steps illustrated in FIG. 2. In one aspect, the processor 401 stores network traffic information received through the link 402 to a storage device or local collector 411 through a link 412 for later retrieval or for export to a central collector, not shown.

Figure 5:
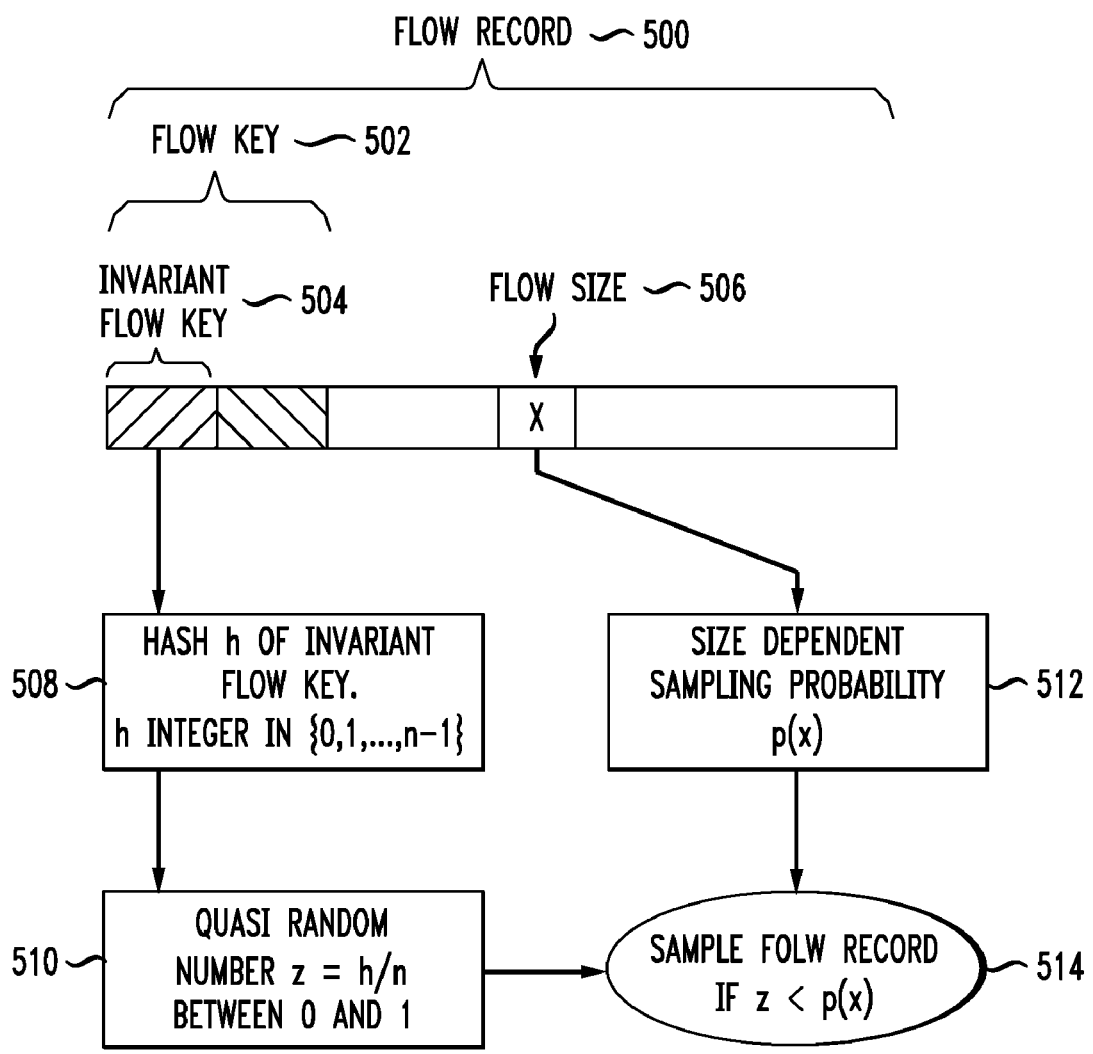
FIG. 5 illustrates a sample flow record.

FIG. 5 illustrates a sample flow record 500. Routers or other network equipment, such as those based on Cisco IOS® Netflow services, gather flow records reflecting network traffic. A flow record 500 contains a flow key 502, a part of which is invariant 504, meaning it is does not change across flow records generated by different routers from the same network flow of packets. As discussed above, some possible elements of the invariant parts 504 of the flow key 502 include source and destination IP addresses, TCP/UDP port numbers, TCP flags, network protocol, number of bytes, and number of packets. The system generates a hash h of the invariant flow key 508, which is an integer between 0 and the maximum hash value, inclusive. The system generates a quasi-random number z that is between 0 and 1 by dividing the hash h by the maximum hash value 510. The system determines a size dependent sampling probability 512 based on the flow size 506. The system samples the flow record 500 if the quasi-random number z is less than the sampling probability 514.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein are applicable to any packet-based network which requires characteristics of trajectory sampling and threshold sampling of network flows. Those skilled in the art will readily recognize various modifications and changes that may be made to the present invention without following the example embodiments and applications illustrated and described herein, and without departing from the true spirit and scope of the present invention.

We claim:

1. A computer-implemented method of sampling network traffic, the method comprising:
   receiving a plurality of flow records;
   calculating a hash for each flow record based on one or more invariant part of a respective flow record;
   generating a quasi-random number from the calculated hash for each respective flow record; and
   sampling flow records having a quasi-random number below a probability P.

2. The computer-implemented method of claim 1, wherein the one or more invariant part of each flow record includes destination IP address, source IP address, TCP/UDP port numbers, TCP flags, and network protocol.

3. The computer-implemented method of claim 1, wherein a plurality of routers uniformly calculates hashes for flow records.

4. The computer-implemented method of claim 1, wherein each router in a plurality of routers generates a same quasi-random number for each respective flow record and uses different values for probability P.

5. The computer-implemented method of claim 1, wherein each router in a plurality of routers uses a same value for probability P.

6. The computer-implemented method of claim 1, wherein the probability P depends on a field in the respective flow record.

7. The computer-implemented method of claim 1, the method further comprising dividing the quasi-random number by a maximum possible hash value to obtain a number between 0 and 1 inclusive.

8. The computer-implemented method of claim 1, the method further comprising exporting sampled flow records to a central collector.

9. A system for sampling network traffic, the system comprising:
   a processor;
   a first module configured to control the processor to receive a plurality of flow records;
   a second module configured to control the processor to calculate a hash for each flow record based on one or more invariant part of a respective flow record;
   a third module configured to control the processor to generate a quasi-random number from the calculated hash for each respective flow record; and
   a fourth module configured to control the processor to sample flow records having a quasi-random number below a probability P.

10. The system of claim 9, wherein the one or more invariant part of each flow record includes destination IP address, source IP address, TCP/UDP port numbers, TCP flags, and network protocol.

11. The system of claim 9, wherein a plurality of routers uniformly calculates hashes for flow records.

12. The system of claim 9, wherein each router in a plurality of routers generates a same quasi-random number for each respective flow record and uses different values for probability P.

13. The system of claim 9, wherein each router in a plurality of routers uses a same value for probability P.

14. The system of claim 9, wherein the probability P depends on a field in the respective flow record.

15. The system of claim 9, further comprising a fifth module configured to control the processor to divide the quasi-random number by a maximum possible hash value to obtain a number between 0 and 1 inclusive.

16. The system of claim 9, the comprising a fifth module configured to control the processor to export sampled flow records to a central collector.

17. A non-transitory computer-readable medium storing a computer program having instructions for sampling network traffic, the instructions comprising:
   receiving a plurality of network flow records;
   calculating a hash for each flow record based on one or more invariant part of a respective flow;
   generating a quasi-random number from the calculated hash for each respective flow record; and
   sampling flow records having a quasi-random number below a probability P.

18. The non-transitory computer-readable medium of claim 17, wherein the one or more invariant part of each flow record includes destination IP address, source IP address, TCP/UDP port numbers, TCP flags, and network protocol.

19. The non-transitory computer-readable medium of claim 17, wherein a plurality of routers uniformly calculates hashes for flow records.

20. The non-transitory computer-readable medium of claim 17, wherein each router in a plurality of routers generates a same quasi-random number for each respective flow record and uses different values for probability P.

* * * * *